(12) United States Patent
Hammoutene et al.

(10) Patent No.: US 9,858,433 B2
(45) Date of Patent: Jan. 2, 2018

(54) CRYPTOGRAPHIC ROLE-BASED ACCESS CONTROL

(75) Inventors: Malik Hammoutene, Martigny (CH);
Milan Petkovic, Eindhoven (NL);
Claudine Conrado, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 840 days.

(21) Appl. No.: 12/067,117

(22) PCT Filed: Sep. 14, 2006

(86) PCT No.: PCT/IB2006/053283
§ 371 (c)(1),
(2), (4) Date: Mar. 17, 2008

(87) PCT Pub. No.: WO2007/031955
PCT Pub. Date: Mar. 22, 2007

(65) Prior Publication Data
US 2008/0263370 A1    Oct. 23, 2008

Related U.S. Application Data

(60) Provisional application No. 60/718,180, filed on Sep. 16, 2005, provisional application No. 60/763,878, filed on Jan. 31, 2006.

(51) Int. Cl.
*G06F 11/30* (2006.01)
*G06F 21/62* (2013.01)
(Continued)

(52) U.S. Cl.
CPC ........ *G06F 21/6245* (2013.01); *H04L 9/0836* (2013.01); *H04L 2209/88* (2013.01)

(58) Field of Classification Search
CPC .... G06F 21/604; G06F 19/323; G06F 19/328; G06F 21/6227; G06F 21/6245;
(Continued)

(56) References Cited

U.S. PATENT DOCUMENTS

| 5,911,143 A | 6/1999 | Deinhart et al. |
| 7,234,063 B1 * | 6/2007 | Baugher ............... H04L 9/0833 380/259 |

(Continued)

FOREIGN PATENT DOCUMENTS

| EP | 1187390 A1 | 3/2002 |
| EP | 1215844 A2 | 6/2002 |

(Continued)

OTHER PUBLICATIONS

Wallner et al "Key Management for Multicast: Issue and Architectures" IETF Standard, Interent Enginnering Task Force, Jun. 1999.
(Continued)

*Primary Examiner* — Gary Gracia

(57) ABSTRACT

A hierarchical tree structure is used to facilitate the communication of encrypted keys to particular users having access to the tree. All users are in communication with a root node, but the information content of the material at the root node is decipherable only by the intended users of this information. Protected data is encrypted using a variety of data-keys specific to the data. These data-keys are encrypted using a combination of node-keys that are specific to particular users or groups of users. Users having access to the node-key associated with a particular encrypted data-key are able to decipher the data associated with the data-key; users without access to the particular node-key are unable to decrypt the data-key, and thus unable to decipher the data. The hierarchical tree is preferably structured based on a similarity of access rights among users, to minimize the overhead associated with providing user-specific access rights.

17 Claims, 2 Drawing Sheets

(51) Int. Cl.
*H04L 9/08* (2006.01)
*G06F 12/14* (2006.01)

(58) Field of Classification Search
CPC ..... G06F 2221/2107; G06F 2221/2141; G06F 2221/2153; H04L 2209/88; H04L 9/3231; H04L 9/3263; H04L 9/3271; H04L 9/3297
USPC ....... 713/193, 156, 165, 166, 167, 173, 175; 726/27, 28, 29, 30
See application file for complete search history.

(56) References Cited

U.S. PATENT DOCUMENTS

| | | | |
|---|---|---|---|
| 7,644,445 B2 * | 1/2010 | Zhu et al. | 726/30 |
| 7,672,945 B1 * | 3/2010 | Chatterjee et al. | 707/999.009 |
| 2001/0030233 A1 | 10/2001 | Asoh et al. | |
| 2001/0039622 A1 * | 11/2001 | Hitz | G06F 21/41 726/30 |
| 2002/0136411 A1 * | 9/2002 | Ishiguro et al. | 380/278 |
| 2002/0169986 A1 * | 11/2002 | Lortz | H04L 63/08 726/4 |
| 2002/0188567 A1 * | 12/2002 | Candelore | 705/51 |
| 2003/0074580 A1 * | 4/2003 | Knouse | H04L 63/0815 726/4 |
| 2003/0076958 A1 * | 4/2003 | Ishiguro et al. | 380/277 |
| 2003/0142826 A1 * | 7/2003 | Asano | H04L 9/0836 380/277 |
| 2003/0182565 A1 | 9/2003 | Nakano | |
| 2003/0185396 A1 * | 10/2003 | Asano et al. | 380/277 |
| 2004/0010468 A1 * | 1/2004 | Abe | G11B 20/00086 705/50 |
| 2004/0120529 A1 | 6/2004 | Zhang | |
| 2004/0210582 A1 * | 10/2004 | Chatterjee et al. | 707/9 |
| 2005/0193196 A1 | 9/2005 | Huang | |
| 2005/0204161 A1 | 9/2005 | Caronni | |
| 2005/0210014 A1 * | 9/2005 | Asano | G06F 21/10 |
| 2005/0238175 A1 * | 10/2005 | Plotkin et al. | 380/281 |
| 2005/0240572 A1 * | 10/2005 | Sung et al. | 707/3 |
| 2005/0271210 A1 * | 12/2005 | Soppera | 380/277 |
| 2005/0276234 A1 * | 12/2005 | Feng et al. | 370/260 |
| 2006/0140411 A1 * | 6/2006 | Zhu | 380/277 |
| 2006/0218400 A1 * | 9/2006 | Kimmel et al. | 713/168 |
| 2006/0242067 A1 * | 10/2006 | Jogand-Coulomb et al. | 705/50 |
| 2006/0242151 A1 * | 10/2006 | Jogand-Coulomb et al. | 707/9 |
| 2006/0242407 A1 * | 10/2006 | Kimmel et al. | 713/166 |
| 2007/0006322 A1 * | 1/2007 | Karimzadeh | G06F 19/323 726/27 |
| 2007/0014399 A1 * | 1/2007 | Scheidt et al. | 380/44 |
| 2007/0061266 A1 * | 3/2007 | Moore et al. | 705/51 |
| 2007/0258623 A1 * | 11/2007 | McGrath et al. | 382/104 |

FOREIGN PATENT DOCUMENTS

| | | |
|---|---|---|
| EP | 1575210 A1 | 9/2005 |
| JP | 2001352321 A | 12/2001 |
| JP | 2004248272 A | 9/2004 |
| JP | 2005056234 A | 3/2005 |
| JP | 2005085136 A | 3/2005 |
| JP | 2005124150 A | 5/2005 |
| WO | 03084166 A1 | 10/2003 |
| WO | 2005027464 A1 | 3/2005 |

OTHER PUBLICATIONS

Fiat et al "Broadcast Encryption" Advances in Cryptology, Aug. 1993, pp. 480-491.

Naor et al "Revocation and Tracing Schemes for Stateless Receivers" Advances in Cryptology, 2001, pp. 41-62.

* cited by examiner

CRYPTOGRAPHIC ROLE-BASED ACCESS CONTROL

CROSS REFERENCE TO RELATED CASES

Applicants claim the benefit of Provisional Application Ser. No. 60/718,180, filed Sep. 16, 2005.

The present system relates to the field of security systems, and in particular to a method and system for providing selective, predominantly role-based, access to protected data.

The increasing frequency of encoding of data into electronic form has substantially increased the need to protect confidential information. Medical records, financial records, legal records, and so on, are routinely encoded as data files, and these data files are often made available to multiple authorized 'users' of the data, such as doctors, accountants, lawyers, and so on.

As more data is collected, and more users are given access, the management of access control becomes more complicated. For example, an individual's general practitioner is likely to have access to all of the individual's medical records. When the individual is scheduled for surgery, the surgeon and anesthesiologist should have access to the records, but perhaps not all of the records. In like manner, a corporation's tax accountant may have different access rights to the corporation's financial data than the corporation's comptroller.

The need for different users to have different access rights to data has lead to the concept of "role-based" access control, wherein users are given access rights based on their roles. In a typical role-based system, the owner of the data classifies each data item, and defines which classifications are available to which group of users, the groups being defined by role, or roles. For example, certain financial data may be classified as 'tax-related', and users in tax roles are given access to tax-related data. In an education environment, certain data in a student's record may be classified as 'academic', and other data 'behavior', and access to these data may be controlled based on the user's role (teacher, administrator, advisor, etc.). In the medical field, as previously noted, surgeons may have access rights to different parts of a patient's data-record than general practitioners, and general practitioners may have different access rights than emergency-room staff, and so on.

Published patent application US 2005/0193196, "CRYPTOGRAPHICALLY ENFORCED, MULTIPLE ROLE, POLICY-ENABLED OBJECT DISSEMINATION CONTROL MECHANISM", filed 26 Feb. 2004 for Huang et al., teaches a role-based access control system and is incorporated by reference herein. In this referenced application, an enforcement entity receives a request for access from a user with a role, and forwards the role and request to a decision entity for a determination whether the role satisfies the conditions for access to the requested information, and if so, communicates an authorization to the enforcement entity. Cryptographic techniques are included to assure the identity of each user. By providing a central decision entity, the administrative cost of maintaining a record of each user's authorization based on potentially changing roles is reduced. This referenced application relies upon an enforcement entity associated with each source of data to protect the data, and does not address protecting the data itself, using, for example cryptographic techniques.

To provide a higher level of security, the protected data should be stored in encrypted form, wherein only authorized users are able to decrypt the data. With potentially hundreds or thousands of authorized users, however, issues regarding key management must be addressed.

In the event that the encrypted data is accessible by a common key which is known to each of the authorized users, the possibility of a security failure because of an inadvertent disclosure of the key is high. Additionally, if one of the users becomes a non-authorized user, the data must be re-encrypted using a new key, and this new key must be distributed to each user.

Alternatively, consistent with the concept of role-based access control, a collection of encryptions of the data could be maintained, each encryption based on a different 'role key', and each user within each role would be given the corresponding decrypting key. In this scenario, if a key is compromised, the encryption based on the compromised role key is replaced by an encryption based on a different key for this role, and only the users within this role group need to be provided with a new key. However, some role groups may be quite large, and/or the membership of each group may change often, and the burden of distributing a new key to each member of a group each time a membership change is made can be substantial.

Published patent application US 2005/0204161, "METHOD AND APPARATUS FOR HYBRID GROUP MANAGEMENT", filed 10 Mar. 2004 by Germano Caronni, teaches the use of a hierarchical tree structure for providing group-access to protected data that does not require the redistribution of keys to each member when a membership change occurs, and is incorporated by reference herein. As taught in this reference application, the protected data is encrypted using a common 'root' key, and each authorized user within the group can retrieve this root key by successive decryptions of keys along the path from the user to the root. Each node contains a key that permits access to the next node on the path toward the root, thereby placing all nodes in communication with the root node. Because the root node in the hierarchical tree is reachable by any and all the nodes in the tree, granting a user access to the data is achieved by granting the user access to any one of the nodes in the tree. Access between a user and a node is via a key that is specific to that user and that node; when a user becomes an unauthorized user, this key is changed, thereby denying the user subsequent access to the tree. For additional security, the nodes that had been used by this user to access the root node are also changed, in case the user had stored one or more of the intermediate keys that had been used to reach the root node. However, because the other nodes, those not in the user's path to the root, would not have been used or accessible by this user, there is no need to change these nodes. In like manner, because the root node contains the root key for decrypting the data, and had been accessible by this user, the data is re-encrypted with a new root key that is subsequently stored at the root node.

A problem with existing role-based-cryptographic-based systems is that although they are efficient for dealing with group-based control of access to protected data, they do not effectively facilitate users who are members of different groups at different times, and they do not allow for efficient inclusion or exclusion of particular users, independent of their role/group. Of particular note, in the above referenced patent application, any and all users who can access the root node have access to the protected data; changing the access rights requires a new hierarchical tree, even though parts of the tree remain intact.

In a medical environment, a doctor can assume different roles at different times. Thus, the doctor's authorized access to information based on role can vary, and although the doctor could be entered as a member to multiple groups, including the doctor in both groups could be contrary to the expected or desired granting of access rights. For example, a doctor who is both a general practitioner (GP) and an emergency-room (ER) specialist may belong to two groups. As a GP to a particular patient's data, a doctor is granted certain access rights; as an ER specialist to the same patient, the same doctor may be granted particularly different access rights. The patient would assume that this doctor only has access to emergency-room related material only when this doctor is on-duty in the emergency room for this patient.

Additionally, the owner of the data may have particular preferences regarding the users who have access to particular information, regardless of their role. If a particular user, for example, is a neighbor or friend of the owner, there may be certain data that the owner would be uncomfortable and/or embarrassed sharing with this neighbor or friend. Or, the owner may not trust certain users with specific data, or may merely prefer to have certain data kept confidential from some users. Alternatively, the owner may prefer to allow particular users (family or friends) to have access to certain information regardless of their roles.

A further limitation of the above referenced patent application is that each differently protected data set requires an access tree that is specific to that data set. In the medical environment, for example, a patient may have a variety of different classes of records, such as a set of records containing the patient's identification/contact information, insurance information, and so on, and another set of records containing general medical information, such as the patient's allergies, medical history, general health, as well as different sets of records related to different medical fields (ophthalmology, cardiology, audiology, etc.). Each of these sets of records will likely have different sets of access rights; for example, all users (doctors, administrators, etc.) may be given access to the patient's identification and insurance data, but only doctors and nurses may be given access to test results. Similarly, doctors will be given access to different sets of medical data, based on the field to which the data relates. For each of these sets of data, a different access tree would conventionally be used.

It is an object of the present system to provide a method and system that facilitates the efficient management of information access in a dynamic environment. It is a further object of the present system to provide a method and system that facilitates owner-specific access rights in a role-based access system. It is a further object of the present system to facilitate the use of the same hierarchical tree structure for controlling different access rights to different data sets.

It is an object of the present system to overcome these and other disadvantages in the prior art.

These objects, and others, are achieved by a method and system that uses a hierarchical tree structure to facilitate the communication of encrypted keys to particular users having access to the tree. All users are in communication with a root node, but the information content of the material at the root node is decipherable only by the intended users of this information. Protected data is encrypted using a variety of data-keys specific to the data. These data-keys are encrypted using a combination of node-keys that are specific to particular users or groups of users. Users having access to the node-key associated with a particular encrypted data-key are able to decipher the data associated with the data-key; other users having access to these encrypted data-keys at the root node are unable to decipher the data, lacking the node-key required to decrypt the data-key. The hierarchical tree is preferably structured based on a similarity of access rights among users, to minimize the overhead associated with providing user-specific access rights.

It should be expressly understood that the drawings are included for illustrative purposes and do not represent the scope of the present system. The present system is explained in further detail, and by way of example, with reference to the accompanying drawings wherein.

Throughout the drawings, the same reference numeral refers to the same element, or an element that performs substantially the same function. The drawings are included for illustrative purposes and are not intended to limit the scope of the present system.

In the following description, for purposes of explanation rather than limitation, specific details are set forth such as the particular architecture, interfaces, techniques, etc., in order to provide a thorough understanding of the present system. However, it will be apparent to those of ordinary skill in the art that the present system may be practiced in other embodiments, which depart from these specific details. For purposes of simplicity and clarity, detailed descriptions of well-known devices, circuits, and methods are omitted so as not to obscure the description of the present system with unnecessary detail.

The present system is presented herein using the paradigm of selective access to medical records, although one of ordinary skill in the art will recognize that the principles presented herein can be applied to a variety of access control applications, and are not limited to the protection of medical records. Similarly, the present system is presented using the paradigm of encryption and decryption to protect data via the use of keys, although one of ordinary skill in the art will recognize that keys can be used to control access to data using techniques other than encryption, such as, for example, controlling communication channels to the data using the keys, controlling access to applications that access the data based on the keys, and so on. In like manner, the term 'key' is used herein to identify any information item that facilitates selective access to otherwise inaccessible information, and, for ease of understanding, a distinction is not generally made between the key that is used to lock the data and the key used to unlock the protected information, even though one of ordinary skill in the art will recognize that asymmetric key-pairs, one for locking, one for unlocking, may be used as the situation warrants.

Figure 1:
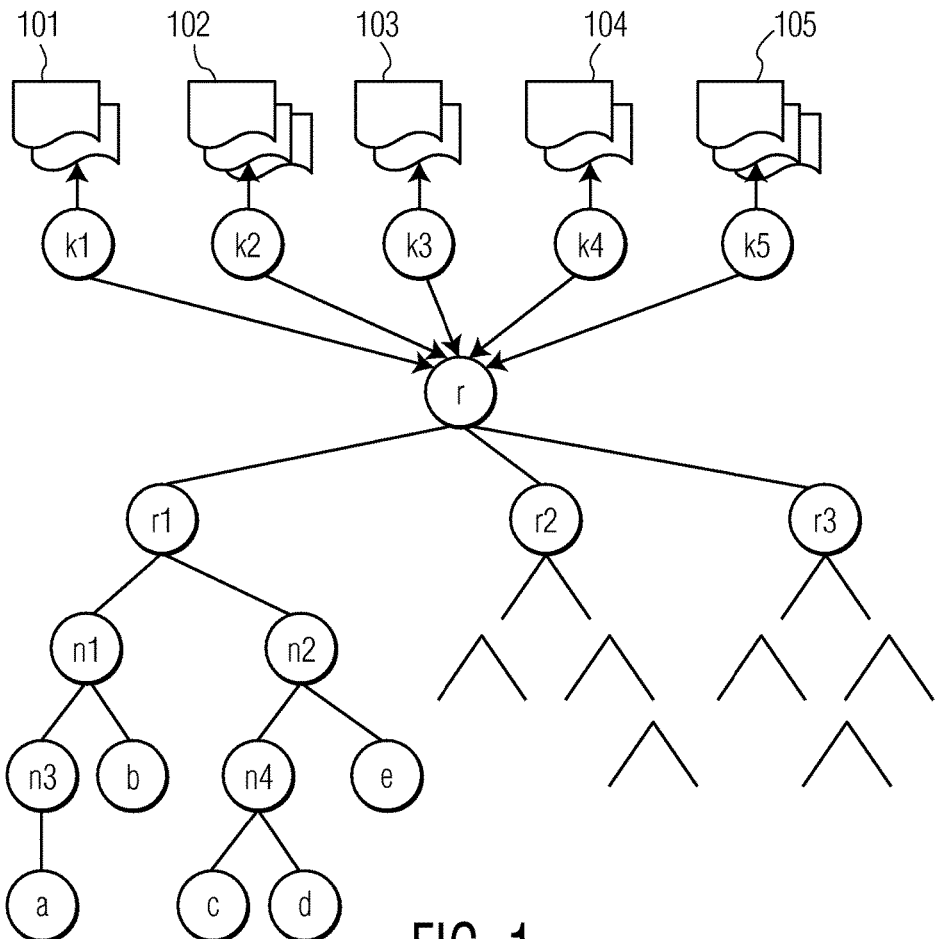
FIG. 1 illustrates an example hierarchical tree structure used to propagate keys that encrypt data to select users in accordance with the present system.

FIG. 1 illustrates an example hierarchical tree structure used to propagate keys that encrypt data to select users in accordance with the present system. Data sets 101-105 are protected using a variety of data-keys k1-k5, typically by encrypting the data using these keys. Although five sets of data and corresponding data-keys are illustrated, the data can be partitioned into any number of data sets with associated data-keys. These data sets are generally sets of related data items, such as sets that include a patient's personnel data, insurance information, routine test results, special test results, known allergies, and so on. In a corporate environment, the data sets could include, for example, personnel data, inventory, capital assets, suppliers, stock holders, and so on. In accordance with one aspect of the present system, these data-keys are communicated to users via a hierarchical tree structure having a root node r, in a protected form, using keys that are associated with the nodes of the tree ("node-keys").

Illustrated in FIG. 1 are three nodes r1, r2, r3 coupled to the root node r, although the number of such nodes coupled to root node r may be more or less than illustrated. In a preferred embodiment of the present system, each of these nodes r1, r2, r3 correspond to different roles associated with access to the data 101-105. Each node r1, r2, r3 has an associated set of other nodes, although only the nodes beneath node r1 are shown in detail for this example. The nodes are preferably arranged in a hierarchical fashion, such as a binary or N-ary tree structure, although any structure may be used, provided that the route(s) between each user and the root node can be identified.

Each of the nodes in the example tree structure is configured to facilitate access to each of its neighbor nodes, in a hierarchical fashion. For example, the node n1 in FIG. 1 is configured to enable access to information at node r1, and configured to enable access to its information from nodes n3 and b. This hierarchical access structure allows each node to reach the root node r. Node b, for example, accesses node n1 to gain the information needed to access node r1, from which the information needed to access node r can be obtained. In accordance with one aspect of the present system, node r is configured to contain selective encryptions of the data-keys k1-kn, and therefore all nodes in the tree are able to access these encryptions of the data-keys k1-km One of ordinary skill in the art will recognize that the data communication scheme illustrated in FIG. 1 can be embodied in a variety of forms. In an alternative embodiment, for example, the information may be broadcast to all of the leaf nodes, and the leaf nodes may be configured to contain all of the keys in their path to the root node. Regardless of where the information and keys are physically stored, these two alternative embodiments are logically equivalent, the basic premise being that leaf nodes have access to keys corresponding to each node on their path, and these keys enable access to information that is available in a protected form to all nodes of the tree.

Previous systems of broadcasting access keys and encrypted content are known. A publication entitled "Broadcast Encryption," by Amos Fiat et al., published in "Advances in Cryptology," CRYPTO '93, pages 480-491, August 1993, teaches the broadcasting of a plurality of keys to each member of a first subset of members so that a second subset of members, not of the first subset, do not have an ability to access a secure transmission intended for the first subset of members, and is incorporated by reference herein. As taught in this reference publication, the number of keys stored by each member may be related to the total number of members and the number of members in the second subset, regardless of the size of the first subset. A publication entitled "Revocation and Tracing Schemes for Stateless Receivers," by Dalit Naor et al., published in "Advances in Cryptology," CRYPTO '01, pages 41-62, 2001, teaches the revocation of decryption rights of encrypted content for stateless receivers, and is incorporated by reference herein. As discussed in this reference publication, a stateless receiver is not capable of recording a past history of previous transmissions. Accordingly, the operation of a stateless receiver is based on a current broadcast transmission (e.g., received by all potential receivers), and an initial configuration that contains access credentials that are unique to each receiver. The required length of the broadcast message is related to the number of revoked receivers and the total number of receivers, while a number of broadcast keys for enabling decryption of the message is related only to the number of revoked receivers.

Having the appropriate key enables the node possessing the key to access/decrypt the protected information, as detailed further below.

The following convention is used to define the encryption of items:

[k(node1), k(node2), etc.)](item), where "node1, node2, etc." indicates the node or nodes at which a key (k(node), hereinafter termed a node-key) for decrypting the "item" can be found. As noted above, throughout this disclosure, the term "encryption" is used in the general sense of providing "protection" from unauthorized access to the item, and the term "decrypting" is used in the general sense of providing access to the protected item.

If all of the data is accessible to all of the nodes, the following information would be available at node r:

[k(r)](k1),[k(r)](k2),[k(r)](k3),[k(r)](k4),[k(r)](k5).

Thus, any node that can access node r is able to access any of the data, because any node that can access node r has access to the node-key k(r) that enables access to each of the data-keys k1-k5 that enable access to the corresponding data 101-105. Alternatively stated, in an embodiment wherein the keys are stored at the user sites: all of the user-nodes, being children of the root node r have a copy of k(r), and thus are able to access/decrypt each of the keys k1-k5, and thus will be able to access/decrypt each of the data sets 101-105.

In accordance with this aspect of the present system, if only the users within role r1 are authorized to access the data 101, which is protected by k1, the information at node r would be:

[k(r1)](k1),[k(r)](k2),[k(r)](k3),[k(r)](k4),

[k(r)](k5).

That is, only those nodes that have access to node r1 will be able to obtain the node-key k(r1) that provides access to data-key k1, which provides access to data 101. Because of the hierarchical access structure of the tree in FIG. 1, the nodes r2 and r3 only provide access to node r, and not to node r1.

In a more complex access scenario, consider the following access rules:

role 1 users have access to all data sets (101, 102, 103, 104, 105);

role 2 users have access to data sets 102 and 104; and role 3 users have access to data sets 101, 102, and 103.

In this example, node r would contain the following information:

[k(r1),k(r3)](k1),[k(r)](k2),[k(r1),k(r3)](k3),[k(r1), k(r2)] (k4),[k(r1)](k5).

That is, each of the users in the tree that can reach the root node r (i.e. all of the users) will be able to receive the above information, but only those that have access to node-keys k(r1) or k(r3) will be able to access data set 101 (via data-key k1); the users that have access to node-key k(r) (i.e. all users having access to the tree) will be able to access data set 102 (via data-key k2); and so on.

Note that by selectively protecting the data-keys that protect the data, the protection of multiple data sets 101-105 among multiple roles r1-r3 based on given role-based rules can be maintained securely and efficiently. Note also that because the rules are applied to specific nodes and apply to all the nodes that can reach the specified node, the addition of new users to existing roles is easily accommodated by merely providing the new users with access to any node within the given role. Similarly, the addition of an additional role and associated users can easily be accommodated by adding the role as a role node that has access to the root node r, and encrypting the data-keys corresponding to the data authorized to users in this role and providing access to corresponding decryption key to all users that have access to this new role node.

The selective protection of data-keys also allows for efficient accommodation of owner-specific inclusions and exclusions of access rights, regardless of the access rights granted based on roles. Consider, for example, the following modification to the above rules:

role 1 users have access to all data sets (101, 102, 103, 104, 105), except that user e does not have access to data 103;
role 2 users have access to data sets 102 and 104; and
role 3 users have access to data sets 101, 102, and 103.

In this example, node r would contain the following information:

[k(r1),k(r3)](k1),[k(r)](k2),[k(n1),k(n4),k(r3)](k3), [k(r1),k(r2)](k4),[k(r1)](k5).

That is, the access to data-key k3 for accessing data 103 is limited to users that can access node-keys k(n1), k(n4), and k(r3). Users a and b can access node n1, and thus have access to k(n1), and users c and d can access node n4, and thus have access to k(n4);

therefore all of role r1 users except user e are able to access the data 103, consistent with the above rules.

Note that when a user's access rights change, such as in this example of user e being denied rights to data set 103, the user is not necessarily removed from the tree, as in the above published application US 2005/0204161. Instead, the protection of the data-key is merely changed to deny this user access to the data-key. Preferably, in the event that the removed user had retained one or more of the keys to which the user had had access, the data set is re-encrypted with a new data-key (in this example, k3), and it is this new data-key that is re-encrypted with the revised authorized node keys (in this example, the node keys k(n1), k(n4), and k(r3) of nodes n1, n4, and r3). Of particular note, changing a user's access rights does not require a replacement of all of the node keys between the user and the root node, as is required in the aforementioned published application.

When a user is removed entirely from the tree, the previously accessible data is re-encrypted by new data-keys, and the process detailed in the reference published application US 2005/0204161 is preferably used, including the replacement of all previously accessible node-keys, thereby denying the user access to the entirety of the tree.

Figure 2:
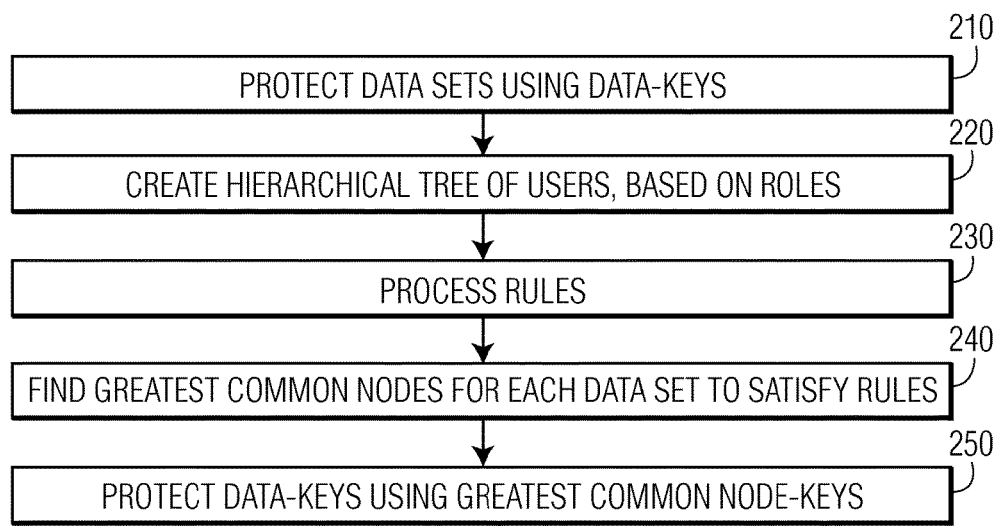
FIG. 2 illustrates an example flow diagram for managing the propagation of data-keys to select users in accordance with the present system.

FIG. 2 illustrates a flow diagram for identifying and protecting data-keys based on access rules associated with data sets. At 210, the data sets are protected using data-keys, as discussed above, typically by encrypting each data set with its associated data-key.

At 220, a hierarchical tree of users is created, generally based on the role of each user, and discussed further below. The structure of the tree within each role is preferably a binary or N-ary tree, although the hierarchy can take on any form.

At 230, the rules are processed to identify the granted access rights and to assure that the rules are consistent, using techniques common in the art for expressing logical expressions. The form and structure of the rules is generally dependent upon the particular application. For example, in some applications, all users within all roles are assumed to be authorized to have access to all data, and the rules are structured to easily identify exclusions to this assumed access. In other applications, no users are assumed to be authorized to have access, and the rules are structured to easily identify grants of access rights. In other applications, the type of data set may define whether the default rule is all-users or no-users, and a mix of rule forms may be used. The processing of the rules is intended to define a unique access/no-access mapping between each user and each data set.

At 240, the access mapping between users and data sets is processed to define the "greatest common access (GCA) node(s)" associated with each user. In a straightforward embodiment, all nodes of the tree are assumed to be configured to provide access, and the access map is processed to identify nodes that are denied access. Fundamentally, for each data set, each node along the path of an unauthorized user to the root node is marked as a 'no-access' node. After marking the 'no-access' nodes, each 'access' child node of each 'no-access' node is identified as a greatest common access (GCA) node.

In the example above, all users of FIG. 1 within role r1, except user e, are granted access to data set 103, as are all users in role r3. Initially, all nodes are marked as 'access' nodes. Tracing up from user e, nodes e, n2, r1, and r are marked as 'no-access' nodes for data set 103, as are all the nodes within r2, including r2. After marking all the 'no access' nodes associated with data set 103, node n4, an 'access' node child of 'no-access' node n2 is identified as a GCA node for data set 103. In like manner, child 'access' node n1 of 'no-access' node r1, and child 'access' node r3 of 'no-access' node r, are similarly identified as GCA nodes. Thus, the set of GCA nodes associated with data set 103 in this example are identified as nodes n1, n4, and r3. In like manner, the GCA nodes for data set 101 are nodes r1 and r3; for data set 102: node r; for data set 104: nodes r1 and r2; and for data set 105: node r1.

At 250, each data-key is protected for access only to each GCA node associated with its corresponding data set. Using the above example, in an embodiment using encryption, data-key k1 is encrypted using each of node-keys k(r1) and k(r3); data-key k2 is encrypted using node-key k(r); data-key k3 is encrypted using node-keys k(n1), k(n4), and k(r3); data-key k4 using node-keys k(r1) and k(r2); and data-key k5 using node-key k(r1). In this manner, any user that can access a node that has a node-key that can decrypt a data-key is able to access the data set protected by that data-key; users that cannot access a data-key associated with a given data set cannot access that data set.

To facilitate the efficiency of the above described key-management process, users having similar access rights are preferably grouped together in the hierarchical tree. If users are generally grouped by access rights, a GCA node will likely include all of these users, and thus the number of GCA nodes for each data set is reduced. The grouping of users by roles, as discussed above, generally provides an efficient hierarchy, particularly in situations where there are few exceptions within the roles.

In some situations, some users have different roles at different times. For example, in the medical field, a doctor may primarily perform the duties of a general practitioner, but on certain days, may perform the duties of an emergency-room physician. On the days the user is performing as a general practitioner, the user should not have the role-based access rights granted to emergency room physicians, and vice versa.

In a preferred embodiment, all users who have a single role are assigned to leaf nodes on their role sub-tree. For the users with multiple roles, there are many possibilities, and extra information about, for instance, the statistics of assignment of users to one or another role can be analyzed to determine an appropriate sub-tree for each user. If a user has predominantly a given role then this role will generally be selected for this user. If a user does not have a predominant role, but the user's assumed role correlates strongly with that of another user, and both are typically given the same access rights, then the unassigned user will be assigned to the role sub-tree of the other user. If, on the other hand, the user does not have a predominant role, and does not exhibit a correlation to another user, then this user may be assigned to a leaf node under the sub-tree of any of the nodes that the user is commonly cast, preferably close to the root node, so that the number of nodes that may be marked as 'no access' between this user and the root node is minimized. Alternatively, a new sub-tree could be created for managing the access of users who do not generally conform to any of the existing roles. Similarly, within role sub-trees, users that are found to be frequently non-conforming to the basic access rights associated with the role, such as multi-role users who are frequently absent from the role, are preferably grouped together and isolated from the generally conforming users, preferably close to the root node.

As will be evident to one of ordinary skill in the art in view of this disclosure, if more information is gained, for example, as the system is used over time, this new information can be used to re-build the tree at any time.

Figure 3:
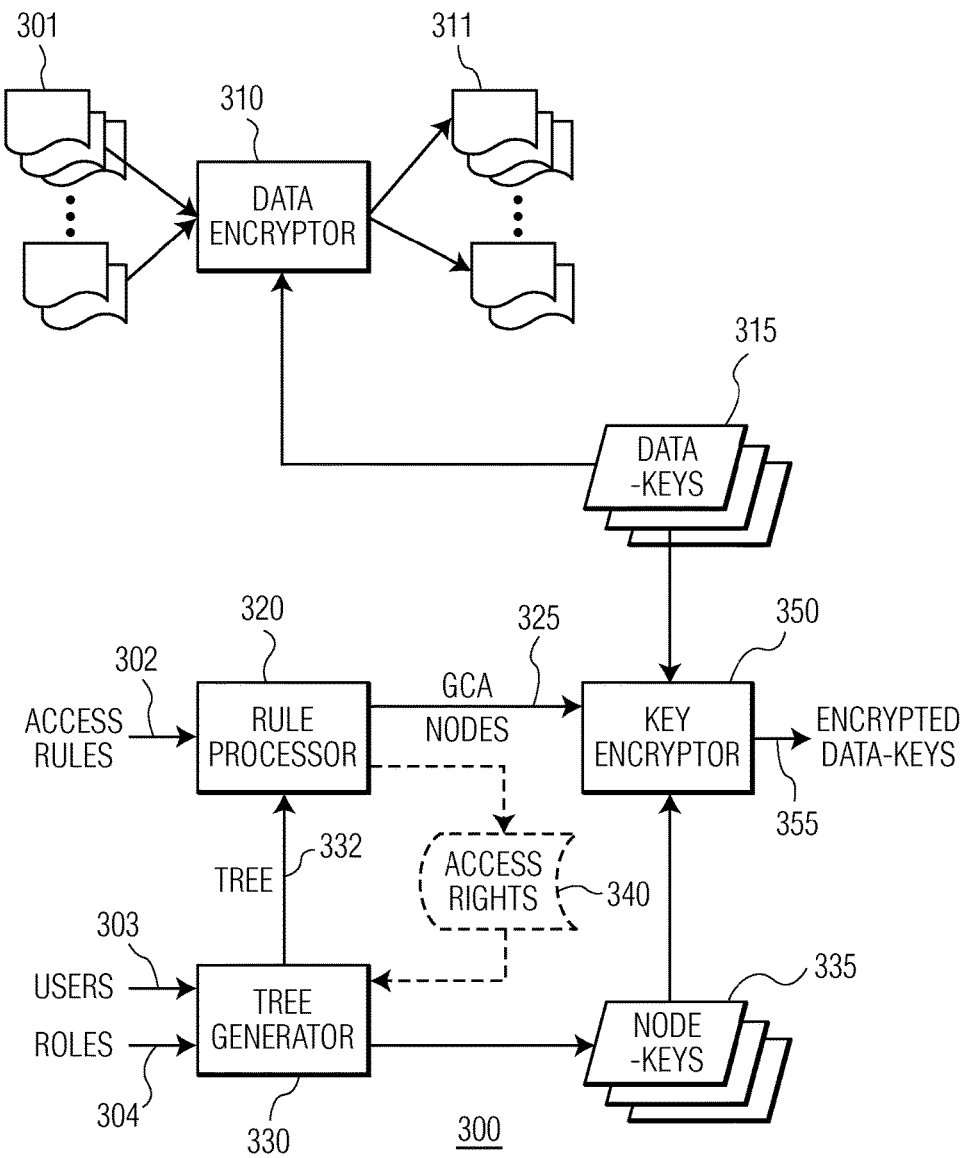
FIG. 3 illustrates an example data access control system in accordance with the present system.

FIG. 3 illustrates an example access-control system 300. A data encryptor 310 is configured to protect one or more data sets 301 by providing protected data sets 311 that can only be accessed via corresponding data keys 315. Preferably, the original data sets 301 are destroyed, or physically isolated from remote access.

A rule processor 320 is configured to process access rules 302 that allocate access rights to the protected data sets 311 among potential users of the data, different access rights being allocatable based on the particular data set, and based on different users or groups of users, as discussed above.

A tree generator 330 is configured to generate an access tree 332 that facilitates the communication of access rights among the users 303 or groups of users 304. The grouping of users is commonly based on the role or roles 304 that each user 303 is performing when access to the data is requested, although other groupings may be used as well. Optionally, as discussed above, the grouping of users may be based on prior or current grants of access rights 340, to minimize the overhead associated with communicating user-specific access rights via the tree 332.

The tree generator 330 also generates node-keys 335 associated with each node of the tree; these node-keys 335 may be the same keys used to gain access from node-to-node along the node's path to the root node, or specific-purpose keys may be generated on-demand, based on the need for each node-key by the key encryptor 350, discussed subsequently.

The key encryptor 350 is configured to encrypt each data-key 315, based on the access rights determined by the rule processor 320. These access rights are communicated from the rule processor 320 as a list 325 of nodes in the tree 332 for which access is granted for each protected data set 311. Although this list 325 could be an exhaustive list of each user node having access to each data set 311, in a preferred embodiment, this list 325 identifies the 'greatest common access' (GCA) nodes having access to each data set 311. As discussed above, each GCA node is a node below which each node has an access right to the given data set. In this manner, any node that can reach a GCA node is given the access right to the given data set, without explicitly listing the node in the list 325.

Using the list 325 of authorized nodes in the tree 332 for each data set 311, the key encryptor 350 encrypts the data-key 315 associated with each data set 311 with the node-key 335 associated with each authorized node for this data set 311. The resultant set of encrypted data-keys 355 is provided to the root node of the tree 332.

Although the key encryptor 350 and data encryptor 310 are illustrated as separate encryption elements, one of ordinary skill in the art will recognize that one encryptor could be used to perform both encryptions.

As discussed above, the tree 332 provides each node in the tree with access to information at the root node (commonly termed placing each node in communication with the root node). However, because the information items at the root node are encryptions of the data-keys 355 with node-keys 335 associated with select nodes 325, only the select nodes 325 can make use of the information at the root node to access each protected data set 311.

The foregoing merely illustrates the principles of the present system. It will thus be appreciated that those skilled in the art will be able to devise various arrangements which, although not explicitly described or shown herein, embody the principles of the present system and are thus within its spirit and scope. For example, although the organization of the example hierarchical tree is presented in the context of a role-based access control system, one of ordinary skill in the art will recognize that the structure of the hierarchy is preferably based on commonly shared access rights, regardless of whether such access rights are based on roles. Similarly, the structure could be built purely based on the statistics related to access control, without regard to associating a cause for the observed correlations. These and other system configuration and optimization features will be evident to one of ordinary skill in the art in view of this disclosure, and are included within the scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements.

The invention claimed is:

1. A method comprising:
encrypting each of a plurality of data sets, by a data encrypting device, with a respective data-key,
creating a hierarchy, by a tree generating device, comprising a root node at a top of the hierarchy, one or more access nodes, and nodes representing existing users having potential access to the plurality of data sets, processing one or more rules, by a rule processing device, to define access rights of each existing user to each of the plurality of data sets, determining, by the rule processing device, for each data set, one or more access nodes in the hierarchy beneath which all existing users have access to the data set, wherein an access mapping between the existing users and the plurality of data sets is processed to define a greatest common access (GCA) node associated with each existing user, the access mapping comprising:

creating an access map to identify nodes denied access to each data set, marking each node along a path of an unauthorized user to the root node as a no-access node, and identifying each child node of each no-access node as a GCA node, encrypting, by a key encrypting device, each of the data-keys with a corresponding node-key associated with each of the one or more access nodes, wherein each data-key is encrypted for access only to each GCA node associated with its corresponding data set, and configuring, by the rule processing device, the root node to contain information defining the access rights of the existing users, wherein the node-key associated with each of the one or more access nodes is accessible by all the existing users in the hierarchy beneath each of the one or more access nodes, and wherein changing the access rights of a particular existing user requires a reconfiguration of the root node and does not require replacement of all node-keys between the particular existing user and the plurality of data sets.

2. The method of claim 1, wherein creating the hierarchy includes grouping of existing users having similar access rights within the hierarchy.

3. The method of claim 2, wherein the grouping of existing users includes determining statistics based on prior allocations of access rights to at least some of the existing users.

4. The method of claim 2, wherein the grouping of existing users is based on one or more roles associated with at least some of the existing users.

5. The method of claim 4, wherein at least one rule of the one or more rules is based on at least one role of the one or more roles.

6. The method of claim 5, wherein the at least one role is associated with a plurality of the existing users, and the at least one rule includes granting different access rights to different existing users within the plurality of the existing users associated with the at least one role.

7. The method of claim 2, including
modifying the hierarchy based on statistics based on prior allocations of access rights to at least some of the existing users.

8. A system comprising:
a data encryptor encrypting each of a plurality of data sets with a respective data-key;
a tree generator generating a hierarchical tree structure comprising a root node, one or more access nodes, and nodes corresponding to a plurality of existing users, each node on the tree being associated with a corresponding node-key;
a rule processor accessing rules to identify access rights of each existing user to each data set, accessing rules to identify access nodes in the hierarchical tree structure beneath which all existing users have access to the one or more data sets, and configuring the root node to contain information defining the access rights of the existing users, wherein an access mapping between the existing users and the plurality of data sets is processed to define a greatest common access (GCA) node associated with each existing user, the access mapping comprising:

creating an access map to identify nodes denied access to each data set, marking each node along a path of an unauthorized user to the root node as a no-access node, and identifying each child node of each no-access node as a GCA node; and a key encryptor encrypting each of the data-keys with a node-key corresponding to each of the access nodes, wherein each data-key is encrypted for access only to each GCA node associated with its corresponding data set, wherein the node-key associated with each of the access nodes is accessible by all the existing users in the hierarchical tree structure beneath each of the access nodes, and wherein changing the access rights of a particular existing user requires a reconfiguration of the root node and does not require replacement of all node-keys between the particular existing user and the plurality of data sets.

9. The system of claim 8, wherein the tree generator generates the hierarchical tree structure based on common access rights within the plurality of existing users.

10. The system of claim 8, wherein the tree generator generates the hierarchical tree structure based on one or more roles associated with the plurality of existing users.

11. The system of claim 8, wherein the tree modifies the hierarchical tree structure based at least in part on prior access rights granted to the plurality of existing users.

12. A method comprising:
encrypting, by a data encrypting device, a plurality of data sets using corresponding data-keys;
defining, by a rule processing device, access rights of each existing user of a plurality of existing users to each data set of the plurality of data sets;
creating, by a tree generating device, a hierarchical tree structure comprising a root node at a top of the hierarchy, one or more access nodes, and nodes representing the plurality of existing users,
determining, by the rule processing device, for each data set, one or more access nodes in the hierarchy beneath which all existing users have access to the data set, wherein an access mapping between the existing users and the plurality of data sets is processed to define a greatest common access (GCA) node associated with each existing user, the access mapping comprising:

creating an access map to identify nodes denied access to each data set, marking each node along a path of an unauthorized user to the root node as a no-access node, and identifying each child node of each no-access node as a GCA node, encrypting, by a key encrypting device, each of the data-keys based on the access rights using a corresponding node-key associated with the hierarchical tree structure, to form a plurality of sets of encrypted data-keys wherein each data-key is encrypted for access only to each GCA node associated with its corresponding data set;

configuring, by the rule processing device, the root node to contain information defining the access rights of the plurality of existing users, and communicating, by the tree generating device, the sets of encrypted data-keys via the hierarchical tree structure to each of the existing users, wherein each node-key is accessible by all the existing users in the hierarchical tree structure an access node associated with the corresponding node-key, and wherein changing the access rights of a particular existing user requires a reconfiguration of the root node and does not require replacement of all node-keys between the particular existing user and the plurality of data sets.

13. The method of claim 12, wherein: creating the hierarchical tree structure includes: associating each existing user to a leaf node of the tree, and forming branch nodes of the tree to create a path from each leaf node to a root node.

14. The method of claim 12, wherein forming the branch nodes includes identifying common access rights among the plurality of existing users, and forming the branch nodes based on the common access rights.

15. The method of claim 14, wherein identifying the common access rights is based at least in part on one or more roles associated with the plurality of existing users.

16. The method of claim 14, wherein identifying the common access rights is based at least in part on one or more prior identifications of access rights among the plurality of existing users.

17. The method of claim 12, wherein each set of the encrypted data-keys corresponds to each data set.

* * * * *